United States Patent Office

3,356,506
Patented Dec. 5, 1967

3,356,506
DOUGH COMPOSITION AND PROCESS FOR PREPARING SAME
Samuel A. Matz, Liverpool, Ernest G. Linke, North Syracuse, and Donald E. Mook, Dewitt, N.Y., assignors to The Borden Company, New York, N.Y., a corporation of New Jersey
No Drawing. Filed Feb. 1, 1965, Ser. No. 429,618
6 Claims. (Cl. 99—90)

This invention relates to a preleavened dough ready for baking in making rolls, biscuits, pastry, or the like bakery products. The invention has particular reference to canned refrigerated chemically leavened doughs and will be described in connection therewith.

In such commercial refrigerated dough practice, there is ordinarily used, as the leavening agent or gas generating component, a slowly acting sodium acid pyrophosphate of the approximate formula $Na_2H_2P_2O_7$ in combination with sodium bicarbonate. All ingredients are mixed, the resulting dough rolled out, the dough then sheeted and cut into blanks such as discs about 1.2–2 inches in diameter by ¼–⅝ inch thick. The cut-outs are dusted with rice flour or oiled to prevent sticking together. They are then stacked and packed in a suitable can. These cans are dough-tight but not gas-tight. As a result, air and carbon dioxide may and do escape so that the dough reaches and blocks the gas outlets. Within about 1.5–3 hours after the package is sealed, for instance, the biscuits will have so expanded as to fill the container and close the original vents for gas and the internal pressure of carbon dioxide generated by the leavening materials will have risen to around 8–16 p.s.i. Pressure within the can will be maintained over a period of 8 weeks or so if the biscuit dough and cans are normal and the storage temperature is between 40° and 50° F.

All of the equipment including containers herein referred to are conventional and are not illustrated.

One of the difficulties in the manufacture of doughs using phosphate leavening agents has been the formation of visible phosphate crystals (disodium phosphate dodecahydrate). This crystal formation occurs at storage temperatures below 50° F., and is frequently most abundant at about 45° F. This crystallization is prevalent in the canned refrigerated doughs because of their extended storage including the normal period of transportation and storage in the stores and homes. These visible crystals cause consumer rejection of the product because of their glass-like appearance and an uneven coloration of the baked goods which develops upon baking.

Efforts have been made to overcome this problem, as illustrated in the Erekson et al. Patent No. 2,942,988, but these have depended on formulation chanegs which have reduced the concentration of sodium or phosphate ions in the dough by substituting materials such as fumaric acid for part of the sodium acid pyrophosphate. Another method is set forth in our copending application Serial No. 172,226, filed February 9, 1962, now U.S. Patent No. 3,166,426, which comprises freezing the dough to retard and prevent visible crystal formation. Such methods are not entirely satisfactory because of the inability to make formula changes in some instances, expense of the substitutes required, or the expense of freezing.

It has now been found that phosphate leavened cereal doughs can be prepared that can be kept at their normal storage temperatures, i.e., between about 40° and 50° F., for periods up to 12 weeks or more and which are free from visible phosphate crystal formation.

Briefly stated, the present invention comprises a conditioned dough for refrigerated storage containing an aqueous phase supersaturated with respect to disodium phosphate. The present invention also includes the method of making such dough by adding disodium phosphate to the water used to form the dough and holding the resultant dough at a temperature above its freezing point but below 32° F. for a time sufficient to deposit microscopic crystals of disodium phosphate dodecahydrate substantially uniformly throughout the dough.

As to materials, the flour, water, shortening, seasoning agents, and other minor ingredients employed in the dough and the proportions thereof are those conventionally used in making bakery products. Typical formulations are set forth in the examples herein and in the Erekson et al. Patent No. 2,942,988. The unique element of the formulation is the use of disodium phosphate as hereinafter described.

The disodium phosphate is preferably used in a hydrated form and in proportions that vary from about 0.05% to about 0.4%, calculated as the septahydrate and based on the weight of the dough. An amount below about 0.05% is generally inoperative and proportions above 0.4% are uneconomical and can cause excessive crystal formation.

The chemical leavening agent used in the dough includes an active alkali bicarbonate in combination with an alkali metal phosphate, both of baking grade. Suitable bicarbonates are sodium and potassium bicarbonate. The use of sodium bicarbonate is preferred. The alkali metal phosphate used is preferably an essentially anhydrous sodium acid pyrophosphate of a slow acting type and of a particle size to pass substantially completely through a U.S. standard 30-mesh screen and usually also through a 60-mesh and at least 50% through 200-mesh. Other suitable phosphates are sodium aluminum phosphate hydrate and sodium aluminum phosphate anhydrous.

In accordance with the present invention the dough is made in the conventional manner, save for the exception hereinafter noted, by admixing the ingredients such as flour, shortening, flavoring, water, the usual minor ingredients, and the chemical leavening agent, and then developing and shaping the dough as desired.

The process to this point varies from the usual in that disodium phosphate is dissolved in the water prior to the addition of water to the dry ingredients.

The dough is then placed in the container and allowed to proof at temperatures of 60°–75° F. Proofing involves the reaction of the chemical leaveners to provide sufficient carbon dioxide to cause the dough to expand and fill the container so as to close the gas vents.

The canned dough is cooled in a conditioning area, such as controlled temperature room, at a temperature above its freezing point, but below 32° F. Normally, the freezing point of such doughs is about 18° F. The time and temperature required to condition the dough will vary dependent upon can dimensions, net weight of the dough, formation of the dough, and refrigeration conditions used. However, it is important that the temperature of the conditioning room not be below the freezing point of the dough. The necessary time and temperature can be determined by withdrawing sample cans at intervals, opening them and noting the temperature and condition of the dough. When microscopic crystals of disodium phosphate dodecahydrate are observed dispersed substantially uniformly throughout the dough, the dough is conditioned and will not exhibit visible phosphate crystals even after 12 weeks of storage. Once the time has been obtained for a given product under given cooling conditions, the same time of treatment can be used for all subsequent batches.

Conventional refrigerated doughs can be conditioned by being held at about 20° F. to 25° F. for about 48 hours. With a higher temperature it is recommended that the holding time be increased to 4 days. At temperatures of about 30° F. a longer holding time of about 8 days is required to obtain proper conditioning of the dough.

After the canned dough has been conditioned, the cans are removed from the cooling area and transferred to the usual storage area where the temperature is maintained at 40°–50° F. Thenceforth, the cans may be transported and the dough used in the ordinary manner.

The invention will be further illustrated by the following specific examples of the practice of it.

In these examples and elsewhere herein proportions are expressed as parts by weight on the dry basis except that the flour is stated on the basis of moisture content of 14%.

Example 1

Doughs with the following formulas were prepared:

|  | 1 | 2 | 3 | 4 |
|---|---|---|---|---|
| Flour | 8,000 | 8,000 | 8,000 | 8,000 |
| Sugar | 500 | 500 | 500 | 500 |
| Salt | 128 | 128 | 128 | 128 |
| Shortening | 500 | 500 | 500 | 500 |
| Non-fat milk solids | 500 | 500 | 500 | 500 |
| Sodium bicarbonate | 160 | 160 | 160 | 160 |
| Sodium acid pyrophosphate | 280 | 280 | 280 | 280 |
| Disodium phosphate .7 $H_2O$* |  | 10 | 30 | 50 |
| Water | 4,280 | 4,280 | 4,280 | 4,280 |
| Roll-in shortening | 2,400 | 2,400 | 2,400 | 2,400 |

*Dissolved in water.

The disodium phosphate was dissolved in the water and the dough prepared by admixing the dry ingredients, including flour, sucrose, salt, milk solids, sodium bicarbonate, and sodium acid pyrophosphate, in a standard mixing bowl used for dough development. The shortening was then blended with the dry ingredients and the resultant dough mixed until thoroughly developed. The roll-in shortening was then incorporated into the dough in such manner as to give a dough with a laminar structure composed of alternate layers of dough and shortening. The dough was finally sheeted out to about ½ inch thickness, and dusted with rice powder. Hexagonal pieces were cut from the dough.

The processed doughs were packaged in fibre cans suitable for refrigerated storage, and allowed to proof 4 hours at ambient room conditions (ca. 70° F.). The cans were then placed in a constant temperature box set at 20° F. and held at this temperature for two days. After this conditioning period, the cans were transferred directly to refrigerated storage at 40° F. and 45° F. Cans of the raw dough were examined for visible crystals after storage for 12 weeks. No visible crystals were observed in any of the doughs containing crystals of disodium phosphate dodecahydrate, either easily visible as surface contaminants or distributed throughout the interior of the pieces.

Example 2

A dough is made with the same formula using the same procedure as that described for Formula 4 under Example 1, except that the canned dough is conditioned at 30° F. for 8 days. Examination of the doughs after 12 weeks storage at 40°–45° F. showed that the incidence of visible crystal formation is reduced drastically over samples with no dissolved disodium phosphate.

It will be understood that it is intended to cover all changes and modifications of the examples of the invention herein chosen for the purpose of illustration which do not constitute departures from the spirit and scope of the invention.

We claim:

1. A cereal dough containing a phosphate leavening agent for refrigerated storage and subsequent baking having its aqueous phase supersaturated with disodium phosphate, whereby upon cooling said dough above its freezing point, microscopic crystals of disodium phosphate dodecahydrate are dispersed substantially uniformly throughout said dough.

2. A biscuit dough containing a phosphate leavening agent for refrigerated storage and subsequent baking having its aqueous phase supersaturated with disodium phosphate, whereby upon cooling said dough above its freezing point, microscopic crystals of disodium phosphate dodecahydrate are dispersed substantially uniformly throughout said dough.

3. A cereal dough containing a phosphate leavening agent for refrigerated storage and subsequent baking having its aqueous phase supersaturated with from about 0.05% to about 0.4% disodium phosphate, whereby upon cooling said dough above its freezing point, microscopic crystals of disodium phosphate dodecahydrate are dispersed substantially uniformly throughout said dough.

4. The method of preventing the formation of visible crystals of disodium phosphate dodecahydrate in cereal doughs for refrigerated storage and subsequent baking containing phosphate leavening acids, comprising the steps of adding disodium phosphate to the water used to form the dough in an amount sufficient to supersaturate the aqueous phase of the dough upon cooling and cooling the dough to a temperature above its freezing point but below 32° F. for a time sufficient to deposit microscopic crystals of disodium phosphate dodecahydrate substantially uniformly through the dough.

5. The method of preventing the formation of visible crystals of disodium phosphate dodecahydrate in cereal doughs for refrigerated storage and subsequent baking containing phosphate leavening acids, comprising the steps of adding from about 0.05% to about 0.4% disodium phosphate to the water used to make the dough and cooling the dough to a temperature between about 20° F. to about 30° F. for a time sufficient to deposit microscopic crystals of disodium phosphate dodecahydrate substantially uniformly throughout the dough.

6. The method of preventing the formation of visible crystals of disodium phosphate dodecahydrate in cereal doughs for refrigerated storage and subsequent baking containing phosphate leavening acids, comprising the steps of adding from about 0.05% to about 0.4% disodium phosphate to the water used to make the dough, cooling the dough to a temperature between about 20° F. and about 30° F., and maintaining the dough at said temperature for a period of about two to about eight days until microscopic crystals of disodium phosphate dodecahydrate are distributed substantially uniformly throughout the dough.

References Cited

UNITED STATES PATENTS

| 2,810,650 | 10/1957 | Joslin | 99—90 |
| 2,942,988 | 6/1960 | Erekson et al. | 99—90 X |
| 3,166,426 | 1/1965 | Matz et al. | 99—192 |
| 3,245,799 | 4/1966 | Matz | 99—90 |

RAYMOND N. JONES, *Primary Examiner.*